(12) United States Patent
Immon et al.

(10) Patent No.: US 6,240,416 B1
(45) Date of Patent: May 29, 2001

(54) DISTRIBUTED METADATA SYSTEM AND METHOD

(75) Inventors: William Harvey Immon, Englewood; Kenneth Dale Richardson, Colorado Springs, both of CO (US)

(73) Assignee: Ambeo, Inc., Englewood, CO (US)

( * ) Notice: Subject to any disclaimer, the term of this patent is extended or adjusted under 35 U.S.C. 154(b) by 0 days.

(21) Appl. No.: 09/151,748

(22) Filed: Sep. 11, 1998

(51) Int. Cl.[7] .................................................. G06F 17/30
(52) U.S. Cl. .............................................. 707/10; 707/203
(58) Field of Search .................................. 707/8, 10, 201, 707/203

(56) References Cited

U.S. PATENT DOCUMENTS

| | | | |
|---|---|---|---|
| 5,675,785 | | 10/1997 | Hall et al. ............................. 707/102 |
| 5,706,495 | | 1/1998 | Chadha et al. ......................... 707/2 |
| 5,721,903 | | 2/1998 | Anand et al. .......................... 707/5 |
| 5,727,197 | | 3/1998 | Burgess et al. ...................... 707/100 |
| 5,758,355 | * | 5/1998 | Buchanan ............................. 707/201 |
| 5,832,496 | * | 11/1998 | Anand et al. ......................... 707/102 |
| 5,870,746 | * | 2/1999 | Knutson et al. ...................... 707/101 |
| 5,974,424 | * | 10/1999 | Schmuck et al. ...................... 707/201 |
| 6,009,427 | * | 12/1999 | Wolff ................................... 707/10 |
| 6,026,408 | * | 2/2000 | Srinivasan et al. ................... 707/103 |
| 6,029,168 | * | 2/2000 | Frey ..................................... 707/10 |
| 6,044,217 | * | 3/2000 | Brealey et al. ....................... 707/103 |
| 6,055,543 | * | 4/2000 | Christensen et al. ................. 707/104 |
| 6,061,692 | * | 5/2000 | Thomas et al. ....................... 707/200 |

OTHER PUBLICATIONS

Speak for Yourself with English Wizard, Thomas C. Hammergren, download from http://my.sybase.com.*
Open Information World, Meta Data Services SDK 3.0, download from www.micosoft.com.*
Metadata Interchange Specification, Version 1.1 (MDIS), Aug. 1, 1997 p. 2–92.
Metadata In The Data Warehouse: A Statement of Vision, Tech Topic 10 (® Pine cone Systems, Inc. 1996), By: W. H. Inmon p. 1–30.

* cited by examiner

Primary Examiner—John Breene
Assistant Examiner—Susan Rayyan
(74) Attorney, Agent, or Firm—Blakely, Sokoloff, Taylor & Zafman LLP

(57) ABSTRACT

A method is disclosed for creating and managing metadata for a distributed computing environment while maintaining the integrity of the metadata. The method includes capturing metadata and loading it into a server or servers—either central or distributed. The metadata is secured into a rigorously defined and managed system of record, ensuring that the system of record operates under stringent and well defined rules. The method further ensures that access to the system of record metadata is executed under the discipline of the system of record. The metadata can be loaded into the managing server—either centralized or distributed—in an automated and synchronized manner, resulting in a networked environment where there is integrity of loading, access, and operation.

25 Claims, 9 Drawing Sheets

DISTRIBUTED METADATA SYSTEM AND METHOD

BACKGROUND OF THE INVENTION

Metadata in its simplest form is data about data. Metadata exists as a secondary component of every data processing operation, and has existed for as long as the first programs were written. Metadata has been generated since the first program was written and since the earliest file was designed. As programs are written, as data is loaded, as users execute reports—metadata is created as a natural by-product of processing.

FIG. 1 shows metadata that exists to describe different aspects of programs, files, and other components of the information processing environment. Some simple examples of metadata include: the structure of a file; the definition of an element of data; the count of the records in a database; the data model describing the higher structure of several databases, and so forth.

In the 1960's very technical metadata was collected and placed in a catalog. In the 1970's technical metadata was placed in a data dictionary. In the 1980's and early 1990's metadata was placed in a centralized repository. Whether it be a catalog, a dictionary, or a repository, the notion of the collection and management of metadata has been done on a centralized basis.

Typically metadata is collected and is attached to a database (i.e., either a proprietary or a commercial database) residing on a server as a set of data, as seen in FIG. 2. Once the metadata was collected centrally, it could then be accessed by distributed parties. However, upon access by distributed parties, no controls or discipline was placed on the metadata after it left the centralized repository.

There were two reasons for the centralization of metadata: (1) most organizations that wanted to collect metadata operated in a centralized mainframe environment, and (2) there was the notion that data needed to be managed centrally if there was to be uniformity and consistency of metadata across the organization.

The notion of a centralized approach to the management of metadata persisted until the 1990's. But in the 1990's there was a strong shift away from centralized systems. With data warehousing and DSS processing came truly decentralized processing. As data warehousing matured, different types of data warehouses emerged. There were enterprise data warehouses. There were data marts. There were operational data stores. There were exploration warehouses, and so forth.

Soon the world of computing was anything but centralized. There were attempts to apply the old centralized models of metadata management to a distributed world, but these attempts were structurally out of phase with each other.

There was an attempt at distributing centralized metadata. This attempt was called the "hub and spoke" approach to distributed metadata. In the hub and spoke approach, metadata was stored and managed in a central location. Then as the metadata was needed outside of the centralized environment the requested metadata was sent—replicated—to the outlying requestor.

In the hub and spoke approach, metadata could be transported from a centralized location to a distributed location. But once having arrived at the distributed location, the metadata entered a nebulous and undisciplined world. The metadata, once distributed, simply became another unit of data at the outlying location, with no special properties, privileges or discipline there. Once at the outlying location, the metadata could be modified, could be passed to anyone else, could be renamed, and so forth. In short there was little or no discipline for the use and management of the metadata once the metadata left the confines of the central metadata management facility.

Another approach is that of the "spoke" approach. In the spoke approach (where a site or a server is the spoke) there is no hub, but otherwise everything else is as described in the "hub and spoke" approach. Metadata is sent from a variety of sources to the outlying sites/servers, but there is no attempt to otherwise manage the metadata once it has arrived at one of the spokes. Once at the spoke, metadata can be altered, can be sent to another spoke, can be renamed, etc. Furthermore, there is no comparison or management of the ownership of metadata across different sites/servers once the metadata has arrived at the spoke.

In order to create a world in which metadata is distributed and is managed with discipline at both the hub AND the spoke, some innovative approaches are required. In order to establish enterprise integrity of metadata for distributed metadata, there need to be some conditions that are created and are reinforced by software across the enterprise.

Several U.S. Patents describe aspects of data warehousing that involve tables and indices of metadata U.S. Pat. No. 5,727,197 discloses a method and apparatus for segmenting a database. The database is divided into multiple data segments, each of which may be independently stored on one of a variety of storage devices. The disclosure is directed to the problem of indexing an incoming data stream.

U.S. Pat. No. 5,721,903 discloses a system and method for generating reports from a computer database. A data warehouse is shown in FIG. 1 of the '903 patent, along with associated metadata. The disclosure does not address the problem of maintaining the integrity and synchronizing distributed metadata U.S. Pat. No. 5,706,495 discloses encoded-vector indices for decision support and warehousing. The disclosure relates to the structure of the metadata, rather than the issues of maintaining a system of record.

U.S. Pat. No. 5,675,785 discloses a data warehouse which is accessed by a user using a schema of virtual tables. An intelligent warehouse hub interfaces the user and the warehouse database.

An organization called the Meta Data Coalition has been working to establish a format for metadata interchange between software tools from different vendors. The Coalition has published Version 1.1 of the Metadata Interchange Specification, dated Aug. 1, 1997. Certain formats are specified in the interchange files to include information on versioning, data elements, and a "configuration profile" which describes the legal flow of metadata. The specification does not disclose how to use the header information to carry out the "system of record" according to the present invention.

The present invention addresses the problem of maintaining integrity and synchronicity of metadata in a distributed computing environment, and particularly in data warehouses, wherein servers can gain access to metadata stored in different sites within the network.

SUMMARY OF THE INVENTION

In accordance with the teachings of the present invention, a system and method for the creation and ongoing management of a system of record for distributed metadata are provided.

The present invention comprises a method for creating and managing metadata for a distributed computing environment while maintaining the integrity of the metadata. The method includes capturing metadata and loading it into a server or servers—either central or distributed. The metadata is secured into a rigorously defined and managed system of record, ensuring that the system of record operates under stringent and well defined rules. The method further ensures that access to the system of record metadata is executed under the discipline of the system of record. The metadata can be loaded into the managing server—either centralized or distributed—in an automated and synchronized manner, resulting in a networked environment where there is integrity of loading, access, and operation.

The first condition for managing distributed metadata is that each unit of metadata has a "system of record." In the system of record concept, each unit of metadata resides on a database at a server, either central or distributed. The data described by the metadata is certainly distributed. But the metadata describing it can be either distributed or centralized. The database containing the metadata that describes the distributed data is designated as a "system of record." Once placed inside the system of record, the metadata is stored, modified, and accessed under a set of well defined rules. All of the servers participating in the distributed network of processors in recognize the rights of management implied by the system of record for the server owning the metadata. The system of record for metadata is the recognition that there is only one place in the enterprise from which any given unit of metadata can be entered, updated, and deleted. The organization that has the rights to access and manipulate the metadata found in the system of record is called the "owner" of the metadata, or the owner of the system of record for the metadata. Furthermore, the owner of the system of record of the metadata has the right to establish who can and cannot access the metadata. This is done by specifying that any unit of metadata inside the system of record can either be sharable or locally autonomous. If the metadata is sharable, it means that the metadata can be shipped to another location that also manages distributed metadata and participates in the integrity of distributed metadata management across the enterprise. If the metadata is marked as being locally autonomous by the owner, it means that the metadata can be looked at and used only by direct users of the environment served by the metadata manager.

Other conditions for managing distributed metadata include: (1) the recognition that after metadata is passed from its system of record, that it be stored and managed with discipline upon arriving at its destination; (2) when metadata is shared (i.e., moved out of its system of record), the metadata carries with it a record of ownership, along with the date the metadata was transported out of the system of record, and other information about restrictions and privileges that relate to the usage of the metadata; (3) recognition that any number of servers can participate in the distributed metadata network; (4) recognition that many types of servers—data warehouses, data marts, ODS, etc.—can participate in the distributed metadata environment; (5) recognition that the distributed metadata environment can be created where there are only distributed servers and where there is a central metadata server and distributed servers.

With the advent of the distributed metadata environment, with its integrity of metadata and the system of record defined and enforced by the software, organizations participating in a large enterprise have an opportunity to manage data and systems in a much more effective manner than ever before.

Distributed metadata requires one or more forms of networking in order to be actuated. However, the kind of network that is required is independent of the facility for establishing and maintaining the system of record. Distributed metadata and the system of record applies to the Internet as well as to other types of networks. The network is merely a mechanism for operating the distributed metadata infrastructure. Stated differently, the distributed metadata environment operates on a series of nodes in a network. The network can be of many varieties, including the Internet.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE INVENTION

Figure 1:
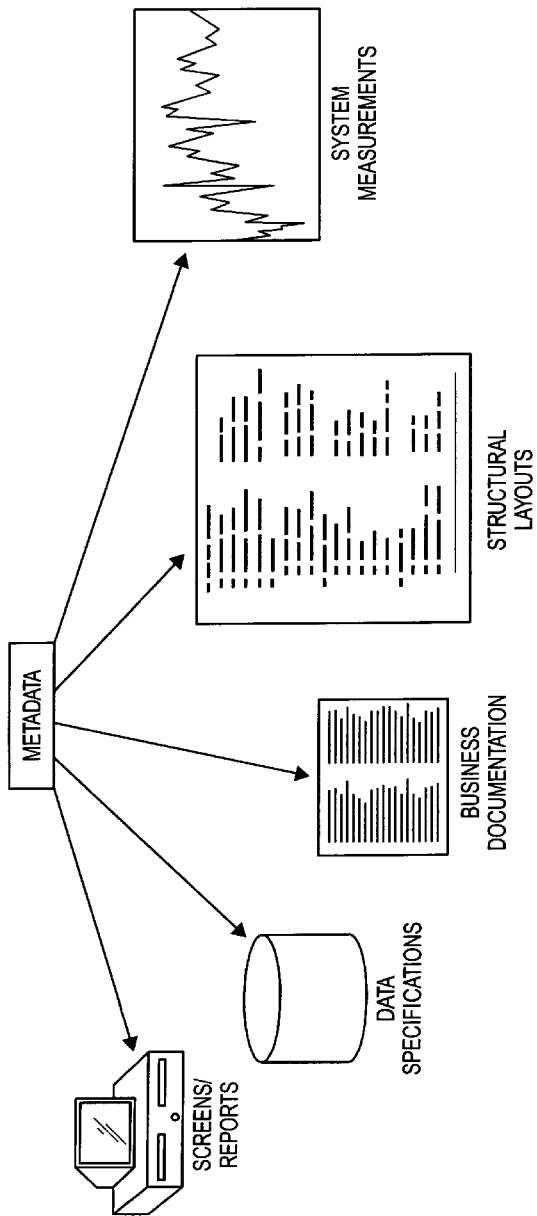
FIG. 1 is a description of the relationship between metadata and other aspects of the world of information processing.
Figure 2:
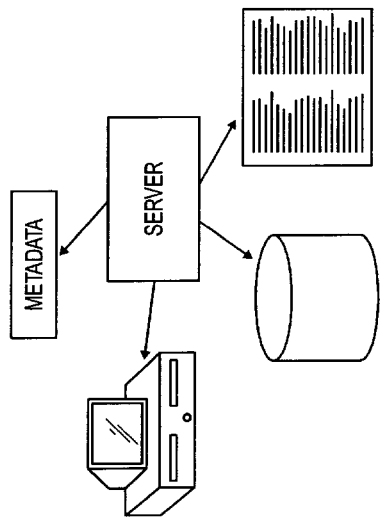
FIG. 2 shows that metadata resides at the server that also hosts most or some of the components described by the metadata.
Figure 3:
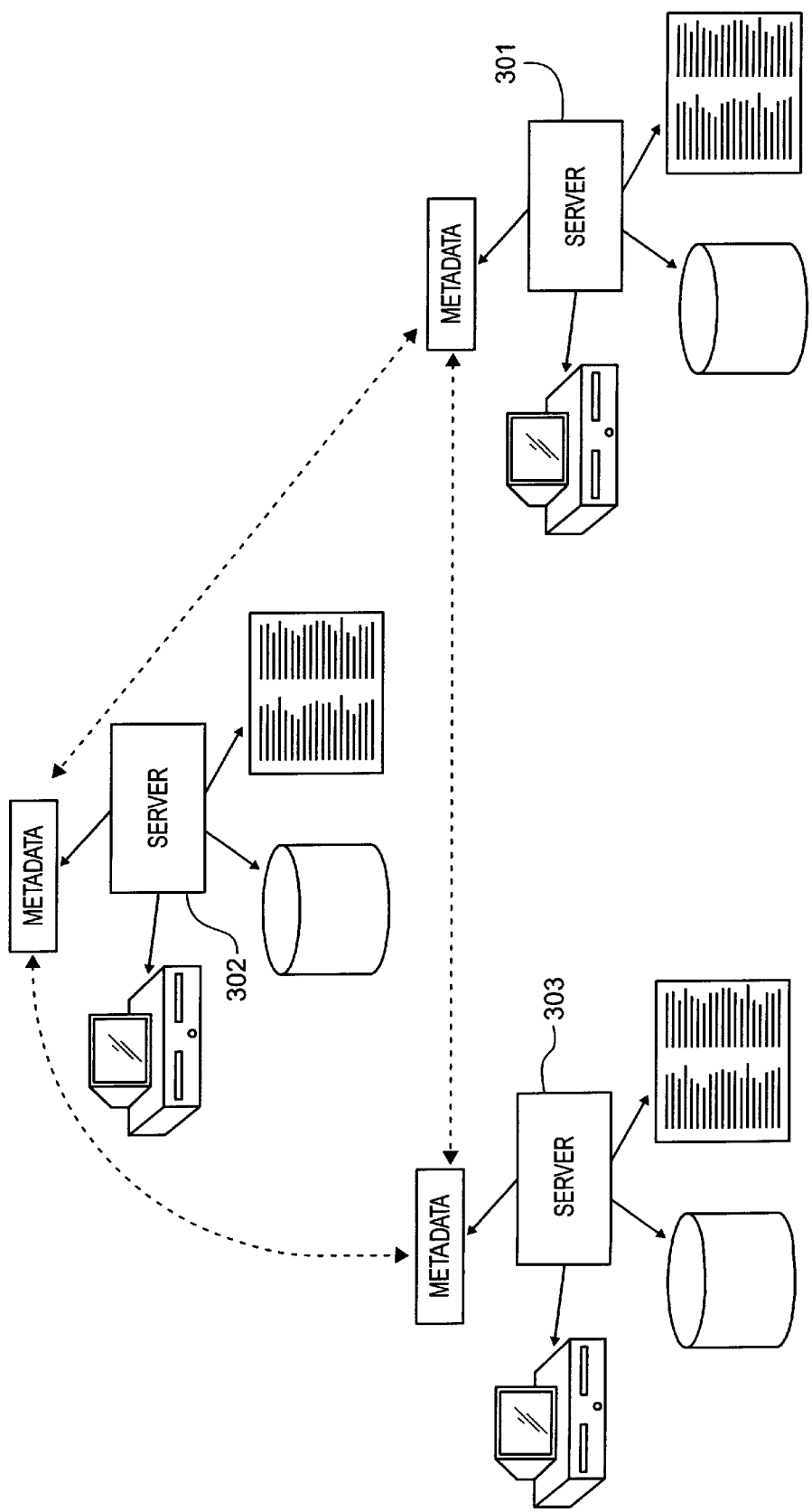
FIG. 3 shows a small network of distributed metadata where there is integrity of metadata enforced by each server having its own system of record for metadata and where each node participates in the network.

With the system of record established and enforced for metadata, a network of servers each having its own system of record is created in which there is integrity of metadata across the environment, as seen in FIG. 3. For purposes of this disclosure, the terms "business metadata" and "system control metadata" are subsets of metadata. Business metadata is the subset of metadata used by commercial databases and business software applications. System control metadata describes a subset of metadata used by network operating systems to control the flow of data through a network.

Referring to FIG. 3, there are three servers shown: 301, 302, and 303. The present invention is intended to be employed on networks and enterprises having any number of servers greater than one. Each of the servers 301, 302, and 303 may share metadata with the other servers on the network, as shown by the dashed lines. While metadata is shared, the integrity of the metadata is maintained through a system of record, as described in more detail below.

Figure 4:
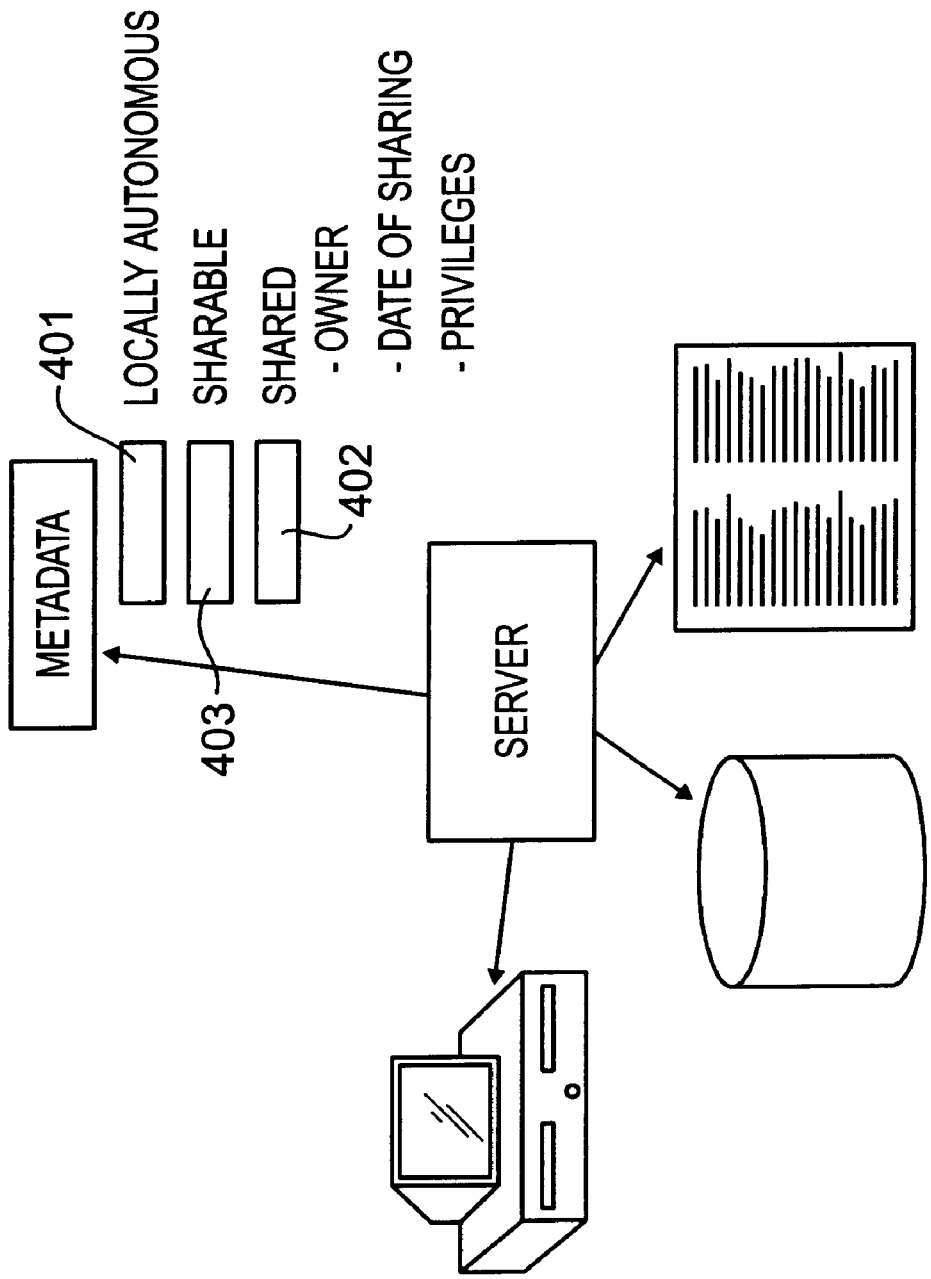
FIG. 4 shows the types of metadata found in and managed by the system of record.

The essence of the establishment of the system of record for any given node in the network (i.e., a server with a database designated as a system of record) is that metadata is created, modified, and deleted with discipline throughout the enterprise. FIG. 4 shows that there are three types of metadata that reside in a server under the discipline of the system of record: (1) locally autonomous metadata (or "local" metadata) as shown schematically by block 401; (2) sharable metadata (or metadata that is "owned" by the server but which is available for other servers to access, as shown schematically by block 403; and (3) shared metadata (which is metadata that belongs to another server but has been transported to the immediate server), shown schematically by 402. The three types of metadata are labeled by a designator having at least states of "local", "sharable", and "shared" In one embodiment, the designator is included in a header for the respective metadata.

Shared metadata carries with it the knowledge of who the owning server is, what the date of sharing is, and any special privileges that the server currently storing the data might have. This is shown in FIG. 4 by the listing under block 402.

Figure 5:
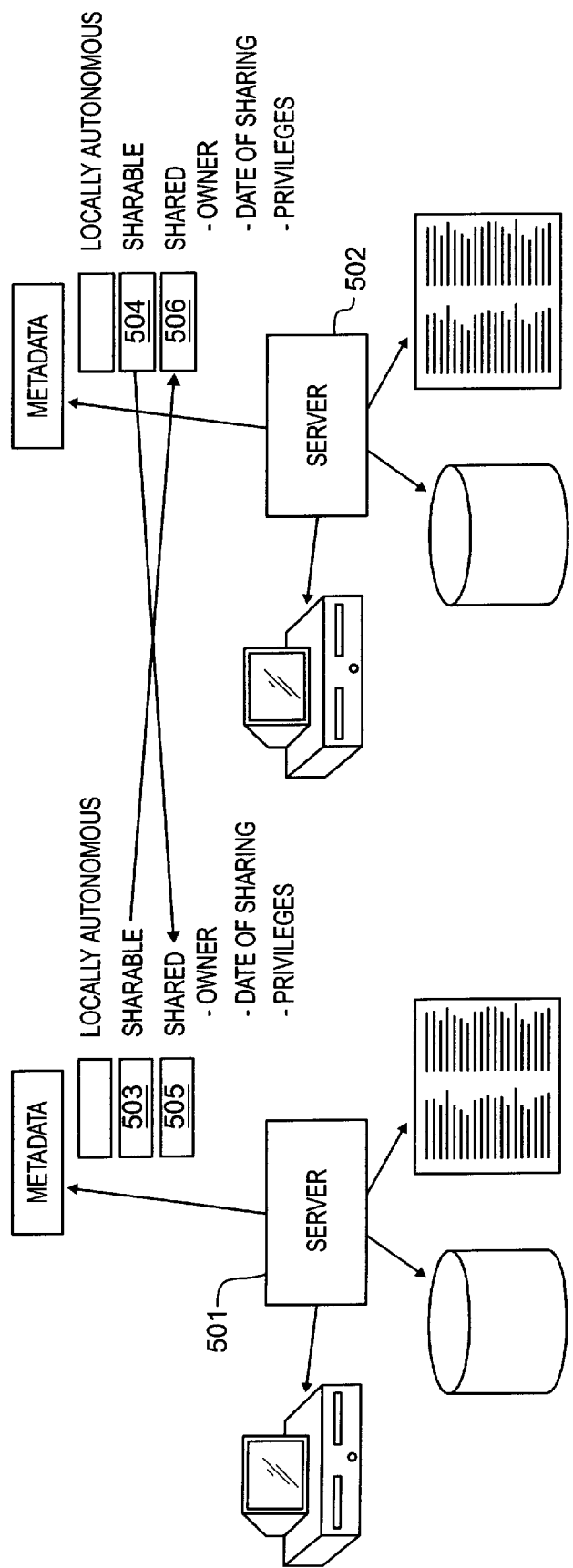
FIG. 5 shows the interaction of two servers with regard to the sharing of data across the servers under the discipline of the system of record established for distributed metadata.

The net effect of sharability across multiple servers managing distributed metadata is illustrated by FIG. 5. In FIG. 5 it is seen that the metadata that is owned by one server that can be shared indeed is transported to a requesting server. Once having arrived at the requesting server, the shared metadata is marked as such, along with the owner and the date of sharing. Server 501 has "sharable" metadata 503 which is transferred to server 502 and becomes "shared" metadata 506. Similarly, server 502 has sharable metadata 504 which is transferred to server 501 and becomes "shared" metadata 505. The markings associated with shared metadata are shown schematically next to blocks 505 and 506. The markings may be in the form of columnar or tabular information stored with the metadata, or may be contained within a header of the block of metadata.

There are two ways the system of record for a server is implemented: (1) as a collection of metadata that resides on the same server that the metadata describes and (2) as a collection of centrally gathered metadata forming a series of multiple systems of record for multiple servers. In other words, the system of record for a distributed server does not have to reside on the same server containing the data described by the system of record. The system of record for many servers can be managed centrally, on a single server designated for the purpose of metadata management. Whether the system of record is physically located centrally or in a distributed manner does not effect the discipline and control of metadata afforded by the system of record across the enterprise.

Figure 6:
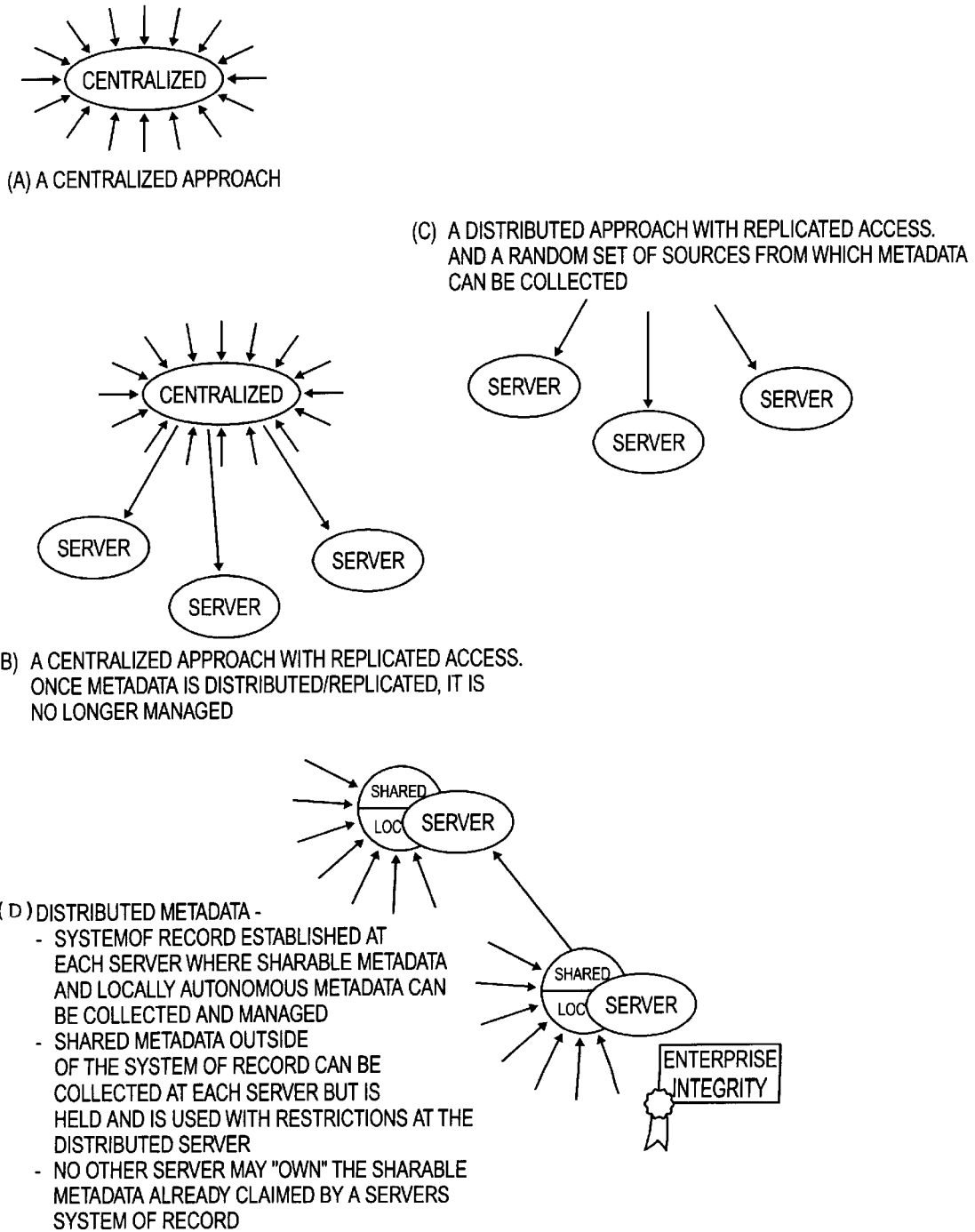
FIG. 6 shows the progression of metadata topologies.

It is useful to compare different topologies for the collection, management, and access of metadata in the computerized environment, as seen in FIG. 6:

(1) a centralized topology where metadata is collected, stored, managed, and accessed centrally as depicted in FIG. 6(*a*). In this case metadata is gathered and managed centrally but there is no system of record that has been defined;

(2) a centralized topology where metadata is collected and managed centrally and then is sent/replicated on request to outlying sites/servers with no discipline. As in the previous case there is no system of record that has been defined. Once the metadata is pushed to and becomes resident at the outlying server, no control of the access, manipulation, alteration of the metadata is made, as depicted in FIG. 6(*b*);

(3) a distributed topology where metadata is sent to outlying sites/servers from a variety of sources. There is no system of record that has been defined here. Once the metadata becomes resident in the outlying server, there is no control of the access, usage, manipulation, or other alterations of the metadata across the many servers of the enterprise. This topology is shown by FIG. 6(*c*), and (4) a distributed topology where metadata is sent to outlying sites/servers from either a central source or other sources and where a system of record for the access, manipulation, alteration, etc. of the metadata is established at the owning site and the discipline of the system of record is maintained across all other sites in the network. This scenario is the subject of the present invention and is depicted in FIG. 6(*d*).

There are several examples of the various topologies for metadata management in the marketplace. The centralized topology (FIG. 6(*a*)) may be typified by older data dictionaries such as IBM's IMS data dictionary, Computer Associates IDMS data dictionary and MSP's Data Manager product. The centralized/replicated distribution product (FIG. 6(*b*)) may be typical of Platinum's Brownstone product and of Platinum's Reltech product. In addition, Microsoft's OIM product may be developing around the centralized/replicated approach. Another advocate of this approach might be Sybase with their Intellidex product. The purely distributed approach with no system of record (FIG. 6(*c*)) is found in government and academic institutions and has been built under the control of customer development. The distributed system of record approach (FIG. 6(*d*)) has been developed by Pine Cone Systems Meta Exchange Manager product.

The present invention relates to the fourth type of topology (i.e., FIG. 6(*d*)), where metadata is gathered at any participating site—distributed or centralized, managed there under a system of record, and the system of record is maintained across all servers participating in the network.

The system of record consists of different data types, such as table name, table attributes, table description, table attribute description, and so forth. There are many types of data that go into the system of record. Each of the types of data describe some aspect of the information processing environment contained in the server. Each record in the system of record is specified as either being local or being sharable. If a record has been specified as local, then the metadata cannot be shared with other servers. If a record has been specified as sharable, then the record can be shared with other servers if a request is made to see the metadata. In addition, each record has a "from" date and a "to" date attached to it so that the effective date for the record can be ascertained. The records that are contained in the system of record form a cohesive picture of some aspect of the data and/or processes found on the server. In other words, the records of data in the system of record are designed to work together to form a larger picture than capable of being described in a single occurrence of a record. The records that exist under the control of the server are of two general types—technical and business. Technical metadata includes a wide variety of descriptive information such as table and attribute description, table relationships, network descriptions, and so forth. Business metadata includes such things as subject area descriptions, business definitions, organization descriptions, and so forth. The actual database is controlled by the DBMS that is housed in the server. The database can be a standard DBMS such as DB2, Oracle, Informix, Sybase, SQL Server, etc.

There is another usage of distributed metadata that may be confused with distributed metadata under a system of record and that case is the usage of distributed metadata during token based distributed management of deadlock. These two cases will be referred as deadlock metadata and system of record metadata for the purposes of the ensuing discussion. There are some significant differences in the environment, intent, and composition of deadlock metadata and system of record metadata. These differences are as follows:

(1) Deadlock metadata is system specific control data for the purpose of managing one aspect of transaction processing; system of record metadata is metadata that controls enterprise access and analysis of data.

(2) Deadlock metadata exists for the purpose of controlling system performance; system of record metadata exists for the purpose of managing access and analysis of the metadata.

(3) Deadlock metadata operates under servers that execute under the same operating system; system of record metadata operates across any operating system.

(4) Deadlock metadata operates under servers that execute under the same DBMS; system of record metadata operates across any Database Management System (DBMS).

(5) With deadlock metadata, there is no system of record.

(6) With system of record metadata there is no token. The change of control of metadata is accomplished by the passing of a token with deadlock metadata; whereas the change of control of system of record metadata is specifically assigned to a database in a server. In order to change the control, the system of record must be deleted from one server, then specifically reassigned and rebuilt on another server. Then the system of record assignment needs to be noted by all servers sharing the data whose ownership has just been changed. No such mechanism exists in the case of deadlock metadata.

(7) Deadlock processing refers to transaction based processing; system of record processing exists for virtually any kind of processing.

(8) With deadlock processing, there is no implication about the usage or manipulation of the metadata being managed. The deadlock metadata simply is used for control purposes; with system of record metadata, the rights of manipulation are specifically addressed in the ownership of the metadata.

(9) With deadlock processing, any node participating in deadlock control does not generally have access to ownership information regarding particular metadata; whereas in the case of system of record metadata, any node sharing metadata can identify the owner of the metadata.

(10) With deadlock metadata, there is no concept of locally autonomous metadata; with system of record metadata there is a definite concept of locally autonomous metadata, and so forth.

These are but a few of the differences between deadlock metadata and system of record metadata.

A method of creating a system of record for the metadata distributed over a network includes the steps of creating the metadata or loading the metadata in from external sources, verifying that the metadata is unique to the server (i.e., establishing the system of record at the server), and establishing the date of creation and the originating source. The method allows some data to be treated as "local" or "locally autonomous" data in which local data is not able to be shared across the network. Other data within the system of record is treated as "sharable." Sharable metadata is able to be moved to another site/server in the network.

The foregoing infrastructure is required to establish the "integrity of metadata" across a distributed environment. In addition to the establishment of the integrity, in order to use and maintain the integrity, the following activities are required—a transaction that queries the system of record of a server and looks at only metadata that can be shared, a transaction that keeps track of the owner of the metadata as it is being shared across the network, and an environment where shared metadata is not able to be altered upon arrival at a site/server other than the site owning the metadata. For purposes of this disclosure, a modification of the designator from "sharable" to "shared", even if it occurs on a remote server, does not constitute an alteration of the shared metadata.

Another aspect of the system of record is called "synchronization." With synchronization, metadata is able to be automatically loaded into the system of record upon undergoing change at the source of the metadata. Periodically, the work station managing the system of record "wakes up" and checks to see if the system of record metadata is the same as the metadata residing in the originating source. If there is a difference in the metadata residing in the originating source and the system of record, the system of record brings in the new metadata and establishes it as the now current system of record. This process is called "automatic metadata synchronization."

Figure 7:
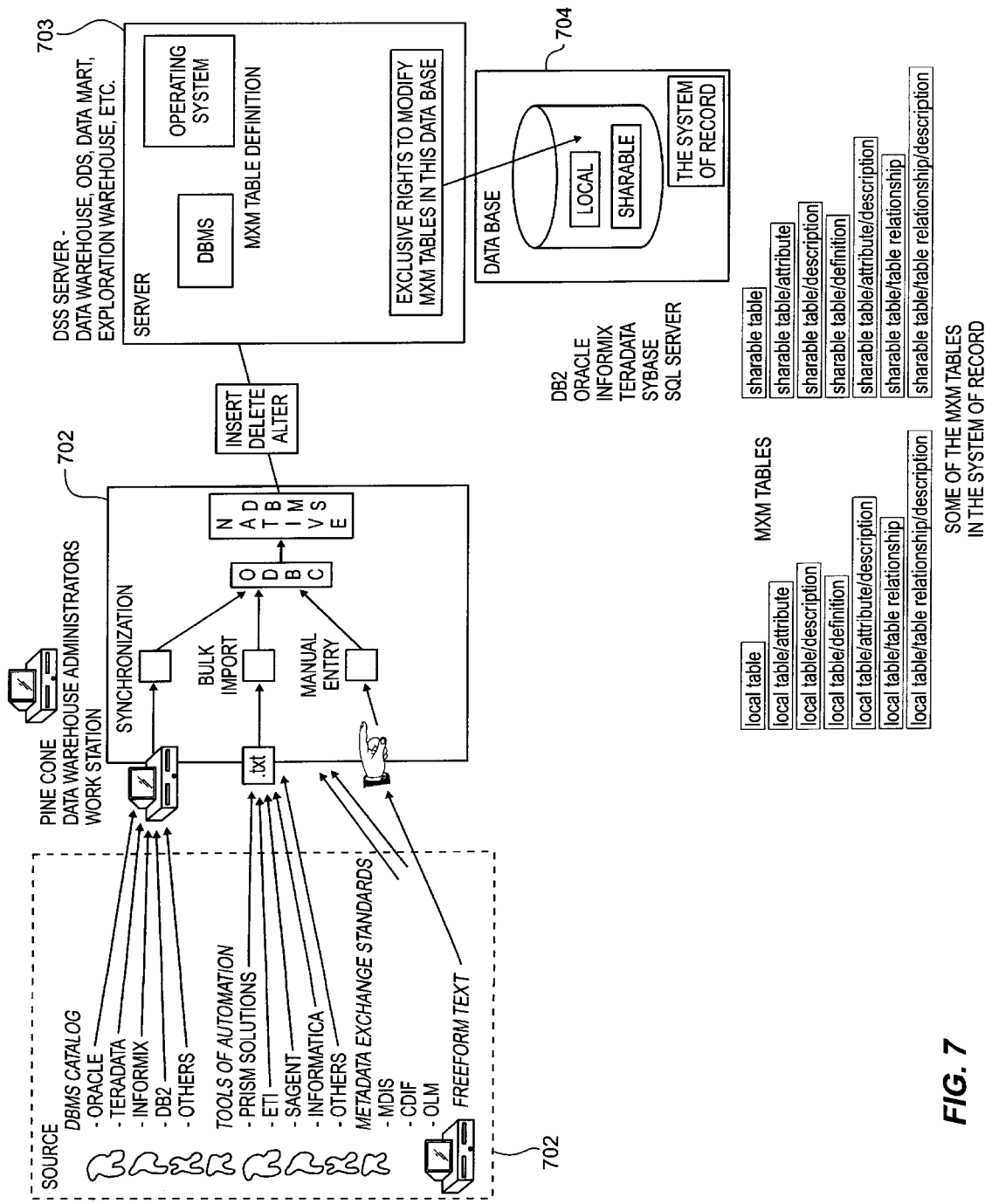
FIG. 7 shows how metadata is loaded and managed into the system of record for a server.

The preferred embodiment of the present invention is Pine Cone's Meta Exchange manager (MXM). Referring now to FIG. 7, there are four main components—a source 701, a work station 702, a server 703, and a database 704. The source 701 of the metadata includes a wide variety of media and storage locations. The typical sources for metadata include (but are not limited to):

(a) DBMS catalogs (which may or may not reside at the server that will host the system of record). Typical DBMS catalogs that may be included are Teradata, Oracle, Sybase, DB2, Informix, and others;

(b) tools of automation that transform data from the legacy application environment, such as ETI, Prism Solutions, Informatica, Sagent, Ardent, and others;

(c) data coming from other sources whose format is standardized, such as MDIS, CDIF, OIM, and others;

(d) free form data, such as text, coming from any source that can be electronically stored.

The source 701 of the metadata can be structured or unstructured. The source 701 of the metadata can be directed into any type of metadata supported by MXM. In other words, when the administrator is deciding to load the metadata into MXM, the administrator selects the appropriate target type and sends the metadata there. For example, the administrator may choose to send one unit of metadata into MXM as a table name, another unit of metadata into MXM as an attribute name, and yet another unit of metadata into MXM as a table description.

Very few assumptions are made about the source of metadata. MXM can accommodate practically any legitimate source in any medium.

The Pine Cone Data Warehouse Administrator's Work Station (WS) 702 is the computer where the administration software is placed. The administration software is designed for the loading of data into the system of record for the server and for the ongoing maintenance of the system of record. The administration software is designed for a technical user and is not designed for general purpose usage by non technical end users.

The system of record is established by the loading of metadata into the WS 702 from a source 701. There are three possible formats the data is loaded in—

(1) by manual entry and control;
(2) by the import of an exported text (.txt) file; and
(3) by synchronization control.

Synchronization control is a program executed in the WS 702 that identifies the source of data and identifies the destination within the system of record. The format the data is loaded in depends on the source of the data. In general DBMS catalog information is loaded in under synchronization control. Free-form text is loaded in under manual control. Other metadata is loaded in as a text (.txt) file.

The following is a description of the operation of MXM which implements the system of record. Once the metadata has arrived from the source, from whatever media, the administrator has the opportunity to edit the metadata and perform other perfunctory tasks, such as determining the destination and structure of the metadata as it is moved for the system of record. After the administrator has prepared the metadata for entry into the system of record, the metadata is passed through an ODBC driver and a native DBMS driver along with instructions from the administrator. The administrator can choose to insert metadata, delete metadata, or alter metadata within the system of record.

If the metadata is to be inserted, the metadata is ordered to reflect the hierarchical structure of the data. For example, a table record must be entered before a table/attribute record can be entered. If a table/attribute record were to be entered before a table record were entered, the table/attribute record would have no table to which it could be attached.

If the metadata is deleted in the system of record, the metadata is deleted in hierarchical sequence. For example, if the administrator were to delete a table record, all records dependent upon the existence of the table would likewise be deleted automatically.

All record activity in the system of record is marked with a from date/to date designation. The from data/to date designation indicates the moment the record was created (i.e., the "from date") to the moment in time when the record is no longer applicable (i.e., the "to date"). If a record is applicable from some moment in time to all time in the future it is called the "current record." The current record reflects the current status of a given record. For a current record, the "to date" designation equals infinity or some representation of infinity.

The third component of the diagram shown in FIG. 7 is that of the server, shown schematically by block 703. The server can function as a data warehouse, an ODS, a data mart, an exploration warehouse, or other architectural component. In short, it does not matter what architectural component the server manifests. The server will contain several standard software components such as an operating system and a DBMS. The hardware manufacturer of the server does not matter. The manufacturer can be IBM, HP, Sun, Sequent, DEC, Pyramid, or any one else. The operating system does not matter. The operating system can be Unix, MVS, NT, or something else. The DBMS does not matter. The DBMS can be DB2, Oracle, Informix, Sybase, SQL Server, or something else. In a word, the existence and operation of distributed metadata is independent of hardware platform, DBMS, or operating system.

The desire to establish a table is made to the DBMS upon the initialization of the system of record. The WS 702 sends a message to the DBMS and the operating system that a set of tables is to be established that will become the system of record. The DBMS does the initialization required and the tables are created in the database that is managed by the DBMS.

Subsequently, when the WS 702 has occurrences of data to load into the tables, a message is sent to the DBMS with the data to be loaded. Before a load can occur, the system must determine whether the same metadata already belongs to another server's system of record. A verification check is done to see that the metadata occurrences to be added to the system of record are not already claimed. If the metadata to be added is already claimed by another server, then an error message is generated and the administrator is informed that metadata cannot be added to the system of record. If however, the occurrence of metadata to be added does not belong to any other server's system of record, then the DBMS loads the data and appropriate indexes into the database.

On occasion the administrator will want to make changes to the data in the system of record. On these occasions, the administrator sends messages and data to the DBMS that cause alterations to be made to the data in the database. In the same vein, on occasion the administrator will want to delete data found in the system of record. On these occasions the administrator will send a message to the DBMS instructing the DBMS to delete one or more records in the system of record.

The DBMS that resides in the server has exclusive rights to the update and management of the data found in the system of record. No other user or no other server can legitimately access the database and cause changes to be made.

The fourth component found in the diagram shown in FIG. 7 is the database, 704. The data base physically contains the data that makes up the system of record. In addition the database can hold other data that belongs in the server's warehouse, data mart, etc.

ACCESSING DISTRIBUTED METADATA Once the system of record has been established, the server can access the data that resides in its system of record. Access at the local level is shown in FIG. 8.

Figure 8:
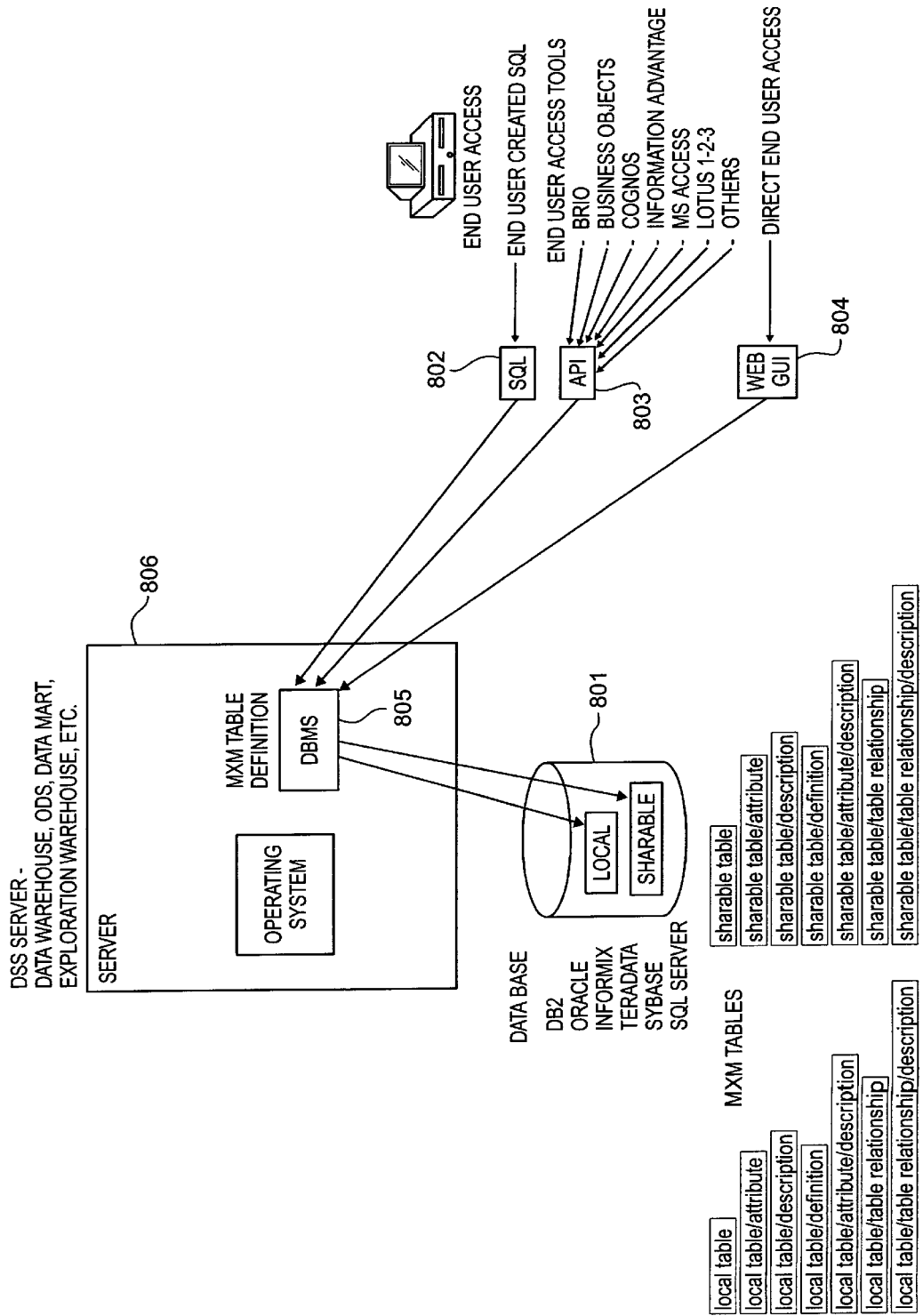
FIG. 8 depicts the local access of metadata managed by a server.

The system of record resides in the database 801 in FIG. 8 as previously described. The local access comes in four modes, as follows:

(1) by native SQL calls, shown by block 802;
(2) by an API provided by Pine Cone Systems, shown by block 803;
(3) by a web GUI interface provided by Pine Cone Systems, shown by block 804; and
(4) by browsing using the technical user interface found in MXM.

When the local end user accesses metadata in the system of record through the SQL interface, the end user creates the SQL directly. The SQL call is issued and passes to the DBMS (shown by block 805) in the server 806. Since the system of record table is a table just like any other table managed by the DBMS (805), the SQL is free to access the system of record data. The end user can access either locally autonomous data or shared data.

When the end user accesses the system of record metadata through the API (803), the end user formats a request according to the API and sends the request, by means of the end user access tool, to the server 806. The server 806 takes the request and translates the request into standard SQL and services the request. This activity is the normal mode of operation for the end user access tool. The end user access tools that are commonly found here include Brio, Business Objects, Cognos, Information Advantage, Microsoft Access, Lotus 1-2-3, and many others. The end user can access either locally autonomous data or shared data.

For the purpose of the API access to the metadata housed in the server, there are two types of access: (1) a general purpose access to determine what occurrences exist in the metadata infrastructure, and (2) a specific access to a given unit of metadata.

When the end user uses the web GUI provided by Pine Cone Systems, the end user merely enters parameters into a preformatted screen. The data is taken from the screen and is translated via the API into a series of SQL requests, which in turn cause data to be returned back to the end user.

Even though there are different mechanisms for the return of data back to the end user, the net effect is the same regardless of the way the end user chooses to access the end user data Once the end user has the metadata at his/her terminal, the end user is free to do with the metadata whatever is desired. All of the metadata found in the system of record is open and available to the end user.

Figure 9:
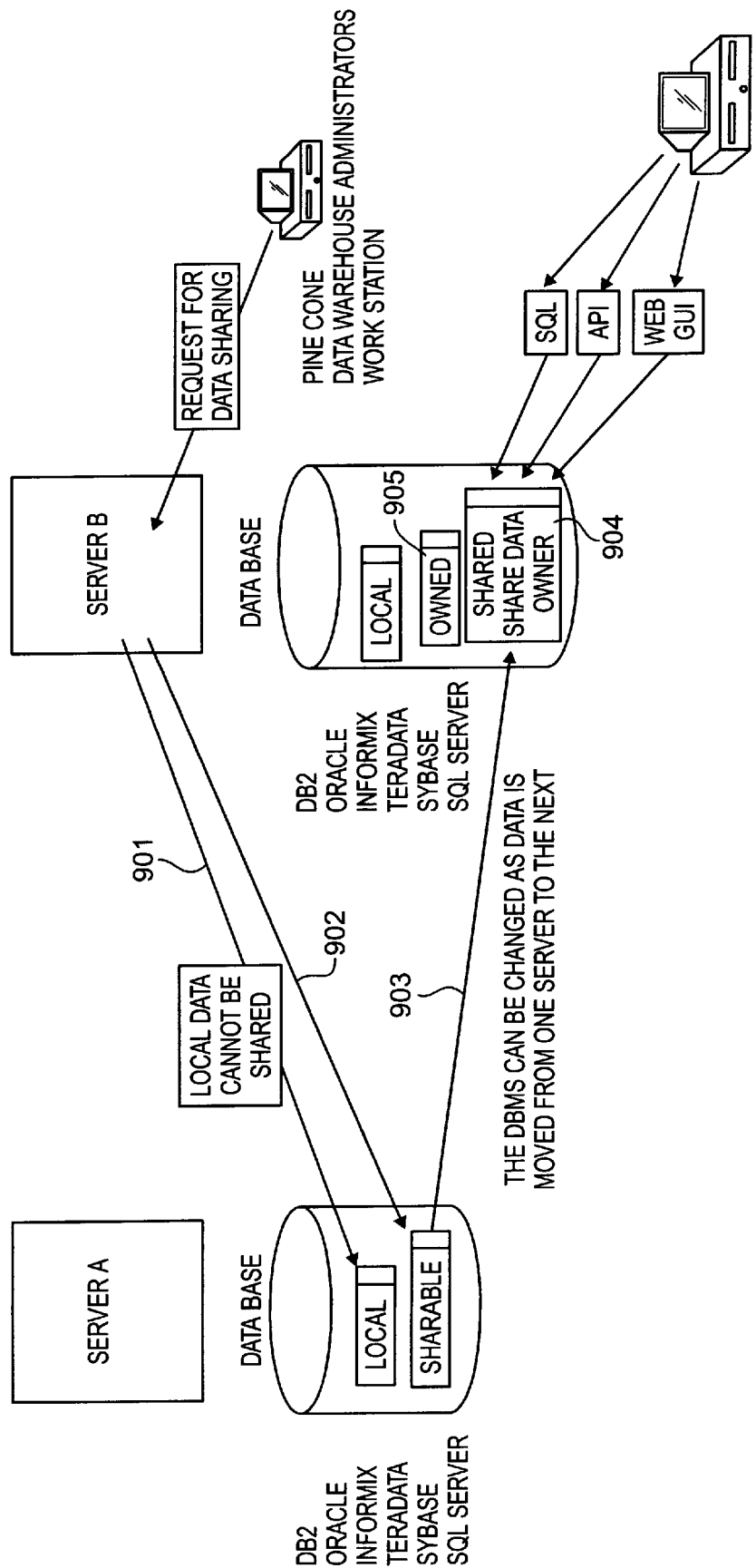
FIG. 9 shows how data is shared between servers.

HOW DISTRIBUTED METADATA IS SHARED In order to illustrate how distributed metadata is to be shared, consider two servers—A and B—as shown in FIG. 9.

Each server has its own system of record, there is no overlap of data in the different systems of record. The servers can be in different DBMS technologies or the same technology. For example, server A may be in DB2 technology and server B may be in Oracle technology. Or server A may be in Sybase technology and server B be in Sybase technology as well. The platforms and the DBMS found on the platform do not make any difference to the operation and the utility of the support of distributed metadata.

In order to show the mechanics of sharing, suppose an end user that is local to server B requests to see metadata residing in the system of record found in server A. The request is initiated in server B. Server B then passes the request on to server A. If the request is for locally autonomous metadata (as show by line 901), the request is denied, since only end users local to server A can see locally autonomous metadata that belongs to server A.

However, if the request is for metadata that has been marked as sharable (as shown by line 902), then server A packages up the metadata that has been requested and sends it to server B (as shown by line 903). Note that a single unit of metadata can be requested or many records of metadata can be requested.

Once the metadata from server A's system of record is sent to server B, server B marks the metadata as "shared." The metadata is stored in the system of record along with other metadata, as shown by block 904. However, the status of shared metadata 904 is quite different than the status of other metadata 905 in server B's system of record. Even though shared metadata can reside in server B's system of record, the shared metadata cannot be altered in any way.

The shared metadata has stored along with it other information such as the date of the sharing and who the owner of the shared metadata is. In the example of FIG. 9, the owner of the shared metadata that has been stored in server B is server A.

The shared metadata can be accessed by end users local to server B by the standard methods that have already been described: by native SQL calls, by access to an API, and by a web GUI.

Figure 10:
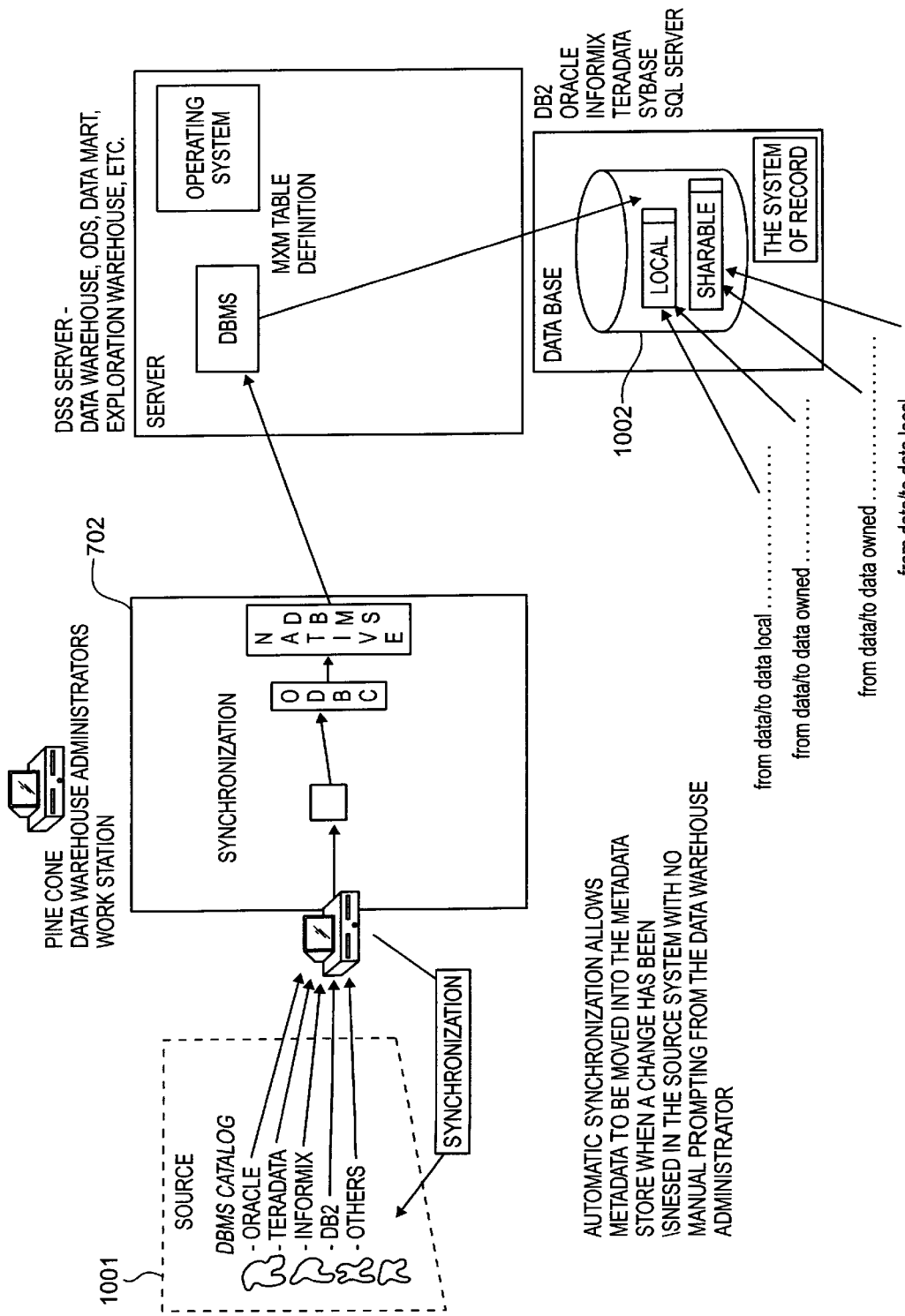
FIG. 10 shows data synchronization from the source of data to the movement of data into the system of record.

AUTOMATIC SYNCHRONIZATION An essential feature of the distributed metadata environment is that of synchronization, as shown in FIG. 10. Synchronization refers to the automatic verification that the metadata residing in the system of record is in fact the most current version of the metadata. Synchronization is not typically done for all sources of metadata. Synchronization is usually done for those sources of metadata that are regularly available on an online basis. For example DBMS catalogs usually can participate in synchronization because the DBMS catalogs are up and running along with the DBMS. But sources such as text that are input manually are not able to be checked periodically because the source of the text disappears as soon as it is entered into the system of record.

For those sources that can be synchronized, synchronization works thusly. Data from various sources (shown in block 1001 in FIG. 10) is loaded into a system of record in the normal manner, through the WS 702. However, as part of the specification of the metadata that will be synchronized, the administrator specifies that periodically the MXM system residing in the work station 702 will return to the source and capture a copy of the metadata. The cycle of refreshment and verification can be daily, weekly, monthly, or other specification of time. The newly captured copy of the metadata from the source is then compared to the most current metadata residing in the system of record. If no changes are found, the captured metadata is discarded and nothing happens. If however, the WS 702 program detects that the newly captured metadata is not exactly like the most current metadata residing in the system of record, then a new version of metadata is loaded into the system of record. The newly loaded metadata will carry a "from date" of the current date and a "to date" value of infinity. The older version of the metadata will have its "to date" value set to the current date in order to form a continuous definition of metadata. The dates are shown in FIG. 10 as being stored within the database 1002 which contains the system of record.

The synchronization function of distributed metadata management allows the sources of metadata to be kept in synch with the system of record with no human intervention.

UTILITIES One of the necessary functions of any distributed metadata management function is a set of utilities that periodically examines the metadata to ensure that data inconsistencies have not cropped up, either through system failure or human error.

Some of the conditions the utilities look for include: (a) multiple owners of the same unit of distributed metadata; (b) metadata that is shared for which there is no owner; (c) hierarchical structures of metadata that contain inconsistencies; and (d) relationships that have been defined that are incomplete; and (e) continuously defined time spans of data that contain overlap or gaps. The purpose of these utilities is to audit the existing distributed metadata infrastructure to ensure that the integrity of the data and the relationships they represent are accurate.

It will be apparent to those of skill in the appertaining arts that various modifications can be made within the scope of the above invention. Accordingly, this invention is not to be considered limited to the specific examples or embodiments chosen for the purposes of disclosure, but rather to cover all changes and modifications which do not constitute departures from the permissible scope of the present invention. Having thus described our invention, what is desired to be secured and covered by Letter Patent is presented in the appended claims.

We claim:

1. A system for distributing metadata and ownership of metadata under a system of record within a computer network, said system for distributing metadata and ownership of metadata comprising:

(a) a local server wherein a record of metadata is owned;

(b) a designator attached to the record of metadata, said designator having at least a local state in which the record of metadata is inaccessible to users of the computer network other than direct users of the local server and a sharable state in which the record of metadata may be transported to another server of the computer network;

(c) a remote server connected to the local server through the computer network;

(d) a query signal generated on behalf of the remote server, said query signal causing the record of metadata to be copied over the network to the remote server when the designator is in the sharable state; and (e) an ownership field associated with the record of metadata which indicates ownership by the local server regardless of where the record of metadata currently resides.

2. The system according to claim 1, wherein the system forms a continuous definition of metadata by recording dates as part of the system of record.

3. The system according to claim 2, wherein the dates provide a definition period to create versioning information for the metadata.

4. The system according to claim 2, wherein a utility examines the system of record for continuity of time spans.

5. The system according to claim 1, wherein the designator for the record of metadata further comprises a shared state when the record of metadata resides on the remote server.

6. The system according to claim 5, wherein the record of metadata is protected from alteration.

7. The system according to claim 1, wherein the metadata comprises business metadata and excludes system control metadata.

8. A method of maintaining metadata in a distributed computer network, the method comprising the steps of:

(a) creating a unit of metadata comprised of:
    (i) a record of ownership,
    (ii) a from date and a to date, and
    (iii) a designator;

(b) setting the designator to indicate whether the unit of metadata is sharable or locally accessible, when the unit of metadata is sharable, the unit of metadata may be transported among servers of a computer network, when the unit of metadata is locally accessible, the unit of metadata is inaccessible to users of the computer network other than direct users of a local server upon which the unit of metadata resides;

(c) transferring the unit of metadata from the local server to a remote server when the unit of metadata is sharable; and (d) protecting the unit of metadata against alteration by the remote server using a system of record.

9. The method according to claim 8, further comprising a step, after the step of transferring, of indicating that the unit of metadata is shared on the remote server.

10. The method according to claim 8, further comprising a step, after the step of transferring, of indicating a date on which the unit of metadata was transferred to the remote server.

11. The method according to claim 8, further comprising the step of creating versioning information for the unit of metadata.

12. The method according to claim 8, further comprising the step of creating a continuous definition of metadata.

13. The method according to claim 8, wherein the unit of metadata comprises business metadata and excludes system control metadata.

14. The method according to claim 8, wherein the step of synchronizing the unit of metadata occurs automatically.

15. The method according to claim 8, wherein the step of synchronizing the unit of metadata occurs periodically.

16. The method according to claim 8, further comprising the step of preventing the transfer of the unit of metadata whenever the designator is other than sharable.

17. The method according to claim 8, further comprising the step of examining the unit of metadata for inconsistencies in ownership.

18. The method according to claim 8, further comprising the step of examining the unit of metadata for continuity of time spans.

19. A method of maintaining metadata in a distributed computer network, the method comprising the steps of:

(a) creating a unit of metadata comprised of:
    (i) a record of ownership,
    (ii) a from date and a to date, and
    (iii) a designator;

(b) setting the designator to indicate whether the unit of metadata is sharable or locally accessible, when the unit of metadata is sharable, the unit of metadata may be transported among servers of the distributed computer network, when the unit of metadata is locally accessible, the unit of metadata is inaccessible to users of the distributed computer network other than direct users of a local server upon which the unit of metadata resides;

(c) transferring the unit of metadata from the local server to a remote server when the unit of metadata is sharable;

(d) indicating a date on which the unit of metadata was shared with the remote server, (e) indicating that the unit of metadata is shared on the remote server;

(f) synchronizing the unit of metadata; and (g) protecting the unit of metadata against alteration by the remote server using a system of record.

20. A method of maintaining metadata in a distributed computer network, the method comprising the steps of:

(a) creating a unit of metadata comprised of:
    (i) a record of ownership,
    (ii) a from date and a to date, and
    (iii) a designator;

(b) setting the designator to indicate whether the unit of metadata is sharable or locally accessible, when the unit of metadata is sharable, the unit of metadata may be transported among servers of the distributed computer network, when the unit of metadata is locally accessible, the unit of metadata is inaccessible to users of the distributed computer network other than direct users of a local server upon which the unit of metadata resides;

(c) transferring the unit of metadata from the local server to a remote server when the unit of metadata is sharable;

(d) indicating a date on which the unit of metadata was shared with the remote server;

(e) indicating that the unit of metadata is shared on the remote server;

(f) creating versioning information for the unit of metadata (g) creating a continuous definition of metadata;

(h) synchronizing the unit of metadata; and (i) protecting the unit of metadata against alteration by the remote server using a system of record.

21. A method of managing and maintaining the integrity of distributed metadata, the method comprising:

a metadata manager running within a distributed metadata environment placing a new unit of metadata stored on a first server of the distributed metadata environment within a system of record, the system of record maintaining a set of rules according to which each of a plurality of units of metadata including the new unit of metadata may be independently accessed and used;

an owner of the system of record establishing accessibility of the new unit of metadata to one or more other servers of the distributed metadata environment via the metadata manager by specifying a state of a designator associated with the new unit of metadata, the designator capable of assuming (a) a local state in which the new unit of metadata is inaccessible to users of the distributed metadata environment other than direct users of the first server, (b) a sharable state in which the new unit of metadata can be transported out of the system of record to a second server of the distributed metadata environment but carries with it a record of ownership and other information about restrictions and/or privileges relating to usage of the new unit of metadata by the second server, and (c) a shared state to which the designator transitions while the new unit of metadata is stored on the second server; and the metadata manager providing access to the new unit of metadata by users of the distributed metadata environment in accordance with the state of the designator associated with the new unit of metadata and the set of rules.

22. The method of claim 21, further comprising the metadata manager performing automatic metadata synchronization by periodically comparing the new unit of metadata to a corresponding current unit of metadata at a source from which the new unit of metadata was originated and updating the system of record to include the corresponding current unit of metadata if there is a difference between the new unit of metadata and the corresponding current unit of metadata.

23. The method of claim 21, further comprising prior to said placing a new unit of metadata stored on a first server of the distributed metadata environment within a system of record, the metadata manager verifying that the new unit of metadata does not already belong to another system of record in the distributed metadata environment.

24. The method of claim 21, wherein the second server or the one or more other servers that may share the new unit of metadata participate in maintaining the integrity of the new unit of metadata by performing modifications of the new unit of metadata, if any, by way of the first server.

25. A machine-readable medium having stored thereon data representing sequences of instructions, the sequences of instructions which, when executed by a processor, cause the processor to:

place a new unit of metadata stored on a first server of a distributed metadata environment within a system of record, the system of record maintaining a set of rules according to which each of a plurality of units of metadata including the new unit of metadata may be independently accessed and used;

establish accessibility of the new unit of metadata to one or more other servers of the distributed metadata environment by specifying a state of a designator associated with the new unit of metadata, the designator capable of assuming (a) a local state in which the new unit of metadata is inaccessible to users of the distributed metadata environment other than direct users of the first server, (b) a sharable state in which the new unit of metadata can be transported out of the system of record to a second server of the distributed metadata environment but carries with it a record of ownership and other information about restrictions and/or privileges relating to usage of the new unit of metadata by the second server, and (c) a shared state to which the designator transitions while the new unit of metadata is stored on the second server; and provide access to the new unit of metadata by users of the distributed metadata environment in accordance with the state of the designator associated with the new unit of metadata and the set of rules.

* * * * *